Figure 1:
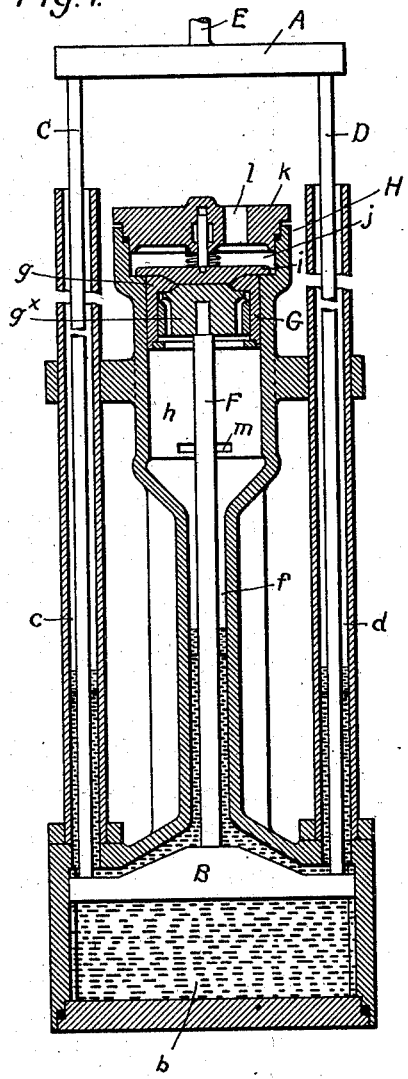

No. 712,548. Patented Nov. 4, 1902.
S. L. G. KNOX.
GAS PUMPING MACHINE.
(Application filed May 8, 1897.)
(No Model.)

WITNESSES.
Marcus L Byng
Erving R. Gurney

INVENTOR.
S. L. G. Knox.
by Arthur Arbuckle,
his Attorney.

THE NORRIS PETERS CO., PHOTO-LITHO., WASHINGTON, D. C.

UNITED STATES PATENT OFFICE.

SAMUEL LIPPINCOTT GRISWOLD KNOX, OF NEW YORK, N. Y.

GAS-PUMPING MACHINE.

SPECIFICATION forming part of Letters Patent No. 712,548, dated November 4, 1902.

Application filed May 8, 1897. Serial No. 635,701. (No model.)

*To all whom it may concern:*

Be it known that I, SAMUEL LIPPINCOTT GRISWOLD KNOX, a citizen of the United States, residing at New York city, in the State of New York, have invented certain new and useful Improvements in Gas-Pumping Machines, of which the following is a specification.

My invention relates to pumping-machines, and is particularly valuable in connection with gas-pumping machines, such as air compressors or exhausters or the compressors of refrigerating-machines, in which motion is imparted to the piston by means of positively-driven linkage actuated by a motor external to the machine.

It has for its object to provide a simple and effectual means of keeping tight the opening through which motion is imparted from the driving-engine to the piston without the use of a stuffing-box, as experience has shown this to be troublesome and to require the services of a skilled attendant to keep it tight.

The invention consists in providing the pumping-machine with a liquid seal of such a character that it constitutes of itself a packing for the linkage through which motion is transmitted to the working parts of the pump.
Such an arrangement not only does away with any possibility of leakage around the moving parts of the machine, but it also materially reduces the friction losses of transmission by doing away with all friction except liquid friction on the parts by which motion is transmitted from the outside to the inside of the pump-casing.

The assembled devices which compose my invention as an entirety are, as will be readily understood, susceptible of various applications in the arts—as, for instance, either to compressors or exhausters for whatever purpose used; but they are of peculiar application in connection with the compressor-cylinders of refrigerating-machines for the reason that the gases operated upon are of such a nature that it is of the utmost importance that they should not be permitted to escape. It is of course not difficult to make the joints between the stationary parts of the machine and between the different sections of the piping tight enough so that no leakage will occur; but in gas-pumping machines as heretofore constructed motion has been transmitted from the motive device to the piston through an ordinary stuffing-box, and therefore there has always been a danger of leakage at this point. Because of the importance of my invention in connection with refrigerating-machines I have particularly illustrated and described it hereinafter in connection therewith.

While various liquids may be used in making the liquid seal, in the application of which to compressors and exhausters lies my invention, (dependent upon the nature of the gas, the maximum and minimum pressures, &c.,) yet in the following description I will consider mercury as the sealing fluid on account of its great weight and the comparatively short columns of it which are therefore needed to balance very considerable differences in pressure.

In the application of my invention to refrigerating-machines the result which I have in view is the driving of the compressor-piston without being dependent upon a stuffing-box.

Mechanism conveniently embodying my improvements is represented in the accompanying drawings and hereinafter described.

Figure 2:
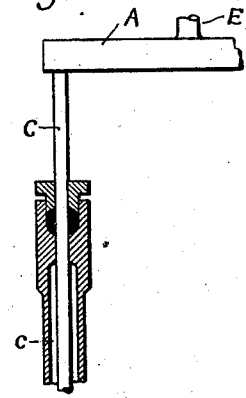

In the drawings, Figure 1 is a view in central vertical section of a compressor-cylinder the piston of which is driven by a linkage operating through a liquid seal constructed according to my invention. Fig. 2 represents a stuffing-box, which may or may not be used in connection with the liquid seal, as hereinafter described.

Similar letters of reference in the different figures indicate corresponding parts.

Referring first to Fig. 1, E represents a rod, to which a vertical movement is given in any desired way, which in turn imparts a vertical movement to the yoke A, through it to the reach-rods C and D, through them to the yoke B, and thence to the piston-rod F and piston G of the gas-pumping machine.

It is to be understood that while I have chosen to illustrate the particular linkage of yokes and reach-rods shown on account of its simplicity, yet it is by no means the only available linkage (in the sense of a mere mechanical movement to transmit the power in the manner desired) which may be employed as connective of the motor and piston. A rotating reach-rod might be used, it in turn driving the piston by means of gearing or crank, connecting-rod and bell-crank, or in any other desired way, in which case but one of the tubes D would be necessary. It is also evident that but one external arm is needed even when the motion is transmitted by a reciprocating movement, two having been shown in the drawings merely because for the particular construction shown the slight internal friction due to side thrust would be thereby eliminated. The column of liquid in the tube $f$, together with the column of liquid in one of the tubes $c\,d$ if the motion is transmitted through a single rod or together with the columns of liquid in both tubes in case both are employed, forms the liquid seal constituting my present invention. The columns are united at their lower ends, so that they may be said to constitute two legs of a single U-shaped column, and in the particular construction which I have illustrated in the drawings the connection is enlarged to form a well $b$ at the bottom of the main casting, in which the yoke B works. The height of the columns of liquid in the tubes $c$ and $d$ is dependent upon the pressure on the suction end of the compressor-cylinder as compared with the pressure of the atmosphere—that is, if the pressure in the lower end of the cylinder $h$ exceeds that of the atmosphere the height of the liquid in the pipes $c\,d$ will be greater than the height of the liquid in the tube $f$, and vice versa. By making the length of the tube $f$ thirty inches or more when the liquid used is mercury and providing enough mercury in the system to permit of this tube being filled without letting the level of the mercury in the pipes $c$ and $d$ fall below the bottom of these pipes the seal cannot be broken by vacuum in the cylinder $h$. On the other hand, by making the length of the pipes $c\,d$ greater than the height of a column of mercury the pressure of which is equivalent to the greatest pressure that can ever come in the chamber $h$, and so proportioning the quantity of mercury in the system that the seal will not be broken by the depression of the mercury below the bottom of the tube $f$ when the pipes $c\,d$ are filled to the aforesaid height, no leakage of gas can take place due to the existence of the aforesaid maximum pressure in the chamber $h$.

Having described how the escape of gas from the cylinder or admission of air to the cylinder by way of the opening necessarily provided for the piston-rod F is prevented, I will describe the operation of the compressor as a whole, that the action of the mercury seal may be more easily understood.

The gas returning to the cylinder of the pumping-machine from the expansion-coils enters the space $h$ beneath the piston by means of the port $m$. The piston G, containing the positive valve $g^\times$, is caused to move up and down by the motor through the yokes and reach-rods, as already described. As the piston-rod moves down the valve $g^\times$ moves in the piston until it engages a stop, limiting its movement therein, and thereafter during the remainder of the downward stroke the piston and valve move together. The gas passing through the valve-ports when the piston is making its downward stroke is forced out through the check-valve $i$ on the upstroke of the piston into the chamber $j$ and thence through the pipes to the expansion-coils.

It is of course evident that in the single-acting compressor which I have illustrated (though I do not confine myself necessarily to a single-acting machine) the mercury seal is only subjected to the suction-pressure maintained in the refrigerating-machine. Under ordinary conditions of working, therefore, the differences in the levels of the inside and outside columns of mercury would be slight compared with the total height of tubes necessary to provide against the maximum pressure possible in case of accident. Owing to the fact, then, that except in case of accident the tubes $c\,d$ could be relatively short, it may be desirable where it is necessary to economize space to use stuffing-boxes at the upper ends of tubes $c\,d$ to prevent outflow of mercury in case of accident, the machine being in no way dependent upon such stuffing-boxes for prevention of leakage, however, except in case of accidental abnormal pressure in the chamber $h$. A stuffing-box as applied to the ends of the tubes $c\,d$ is shown in Fig. 2.

While it is desirable to use mercury for the seal on account of its weight, yet in many cases it may be desirable to have a layer of some other liquid or solid floating on top of the mercury columns to protect the mercury against the action of the gas in case that should be found necessary. I therefore wish to use, if desirable, a layer of any desired material, such as oil, as a sort of buffer between the mercury and the gas and also as an extra precaution against leakage.

While I have described my invention in connection with a gas-pumping machine, and while it is particularly valuable in such a connection, I desire it to be understood that my invention is not limited to the particular application described, and in the claims hereto appended I aim to cover the said invention in whatever connection it may be found desirable to use it.

What I claim as new, and desire to secure by Letters Patent of the United States, is—

1. The combination with a pump-casing, and piston moving therein, of a source of power external thereto, power-transmitting means between the source of power and the piston, a liquid seal through which passes said power-transmitting means, said seal being contained in a vessel having two vertically-extending arms separated from each other except at their lower extremity, at which point they communicate with each other, the upper extremity of one of these arms being in communication with the interior of the pump-casing, and the upper extremity of the other arm being in communication with the exterior thereof.

2. In combination, a pump-casing, a piston therein, a mechanical connection between said piston and an external source of power, a column of liquid through which said mechanical connection extends, and a second column of liquid interposed between said first column and the interior of the pump-casing, the said columns being of a suitable length to prevent leakage under differences of pressure that exist between the exterior and the said interior in the operation of the pump.

3. In combination, a pump-casing, a piston therein, means for operating said piston, and a liquid seal for said operating means comprising a plurality of separate liquid columns united at their extremities, the said columns being of a suitable length to prevent leakage under any differences of pressure that exist between the said interior and the exterior in the operation of the pump.

4. In combination, a pump-casing, a piston therein, means for operating said piston, and a liquid seal constituting of itself a packing for said operating means, the said seal consisting of a U-shaped column of liquid contained in pipes communicating at one end, the lengths of the said pipes and of the column of liquid being such that the seal will prevent leakage under any differences of pressure that exist between the interior and the exterior of the pump in the operation thereof.

5. A packing for a piston driving-rod consisting of a U-shaped column of liquid contained in two pipes communicating at their lower ends, the lengths of the said pipes and of the said column being such that the column of liquid will of itself prevent leakage from the interior to the exterior of the piston, under any differences of pressure that exist between the said interior and exterior.

6. In combination, a vertically-arranged cylinder having a piston therein, a downwardly-extending tube connecting the bottom of said cylinder to a receptacle beneath the same, an upwardly-extending tube or tubes leading therefrom, a body of liquid filling said receptacle and rising into said tubes, and a mechanical linkage passing through said tubes and constituting a means for communicating motion from the exterior to said piston.

7. In combination, a pump-casing, a U-shaped tube having one of its legs in communication with the interior of the pump-casing, a piston driving-rod, a packing therefor consisting of a column of liquid contained in the said U-shaped tube, the said column being of such a length that it will of itself prevent leakage under any differences of pressure that exist between the exterior and the interior in the operation of the pump, and a stuffing-box around the driving-rod at the extremity of one of the legs of the U-shaped tube.

8. In combination, a pump-casing, a piston therein, means for operating said piston, a plurality of upwardly-extending tubes united at their lower ends, a liquid seal for the operating means consisting of a column of liquid contained in the said tubes, the column being of such a length that it will of itself prevent leakage under any differences of pressure that exist between the exterior and the interior in the operation of the pump, and a stuffing-box surrounding the said operating means at the extremity of one or more of the said tubes.

In testimony that I claim the foregoing as my invention I have hereunto signed my name this 6th day of May, A. D. 1897.

SAMUEL LIPPINCOTT GRISWOLD KNOX.

Witnesses:
HERBERT HOWARD KNOX.
RENWICK B. KNOX.